US008232732B2

(12) United States Patent
Bolzan

(10) Patent No.: US 8,232,732 B2
(45) Date of Patent: Jul. 31, 2012

(54) LIGHT MODULE FOR SIGNALING

(75) Inventor: Jose Carlos Bolzan, Sao Paulo (BR)

(73) Assignee: Rontan Eletro Metalurgica Ltda., Tatui, Sao Paulo (BR)

( * ) Notice: Subject to any disclaimer, the term of this patent is extended or adjusted under 35 U.S.C. 154(b) by 315 days.

(21) Appl. No.: 12/540,434

(22) Filed: Aug. 13, 2009

(65) Prior Publication Data

US 2010/0264849 A1 Oct. 21, 2010

(30) Foreign Application Priority Data

Apr. 16, 2009 (BR) ...................................... 0901019

(51) Int. Cl.
*H04B 1/16* (2006.01)
*B60Q 1/26* (2006.01)

(52) U.S. Cl. .................... 315/200 A; 315/292; 315/362; 315/500; 362/249.02; 362/191; 362/183; 446/47; 446/129; 446/242

(58) Field of Classification Search .............. 315/200 A, 315/292, 362, 500; 362/249.02, 191, 183, 362/253, 500, 545, 800, 806; 446/47, 129, 446/242
See application file for complete search history.

(56) References Cited

U.S. PATENT DOCUMENTS

| | | | | |
|---|---|---|---|---|
| 5,384,593 | A * | 1/1995 | Gell et al. | 348/61 |
| 5,406,300 | A * | 4/1995 | Tokimoto et al. | 345/31 |
| 6,270,391 | B1 * | 8/2001 | Emilsson | 446/47 |
| 6,565,243 | B1 * | 5/2003 | Cheung | 362/500 |
| 6,936,980 | B2 * | 8/2005 | Wang | 315/292 |
| 7,997,764 | B1 * | 8/2011 | Nielson | 362/249.02 |

* cited by examiner

*Primary Examiner* — Vibol Tan
(74) *Attorney, Agent, or Firm* — B. Aaron Schulman, Esq.; Stites & Harbison, PLLC

(57) ABSTRACT

A light module for signaling comprising an assembly module (1), defined by a body with any geometry and ordinarily in the form of a box (2), including a rear closing (3) and a frontal lens (4) and, between said parts, an electronic circuit (5) and a corresponding set of light emitting diodes (6), being said electronic circuit (5) constituted by the following blocks: a source (7) to regulate the feeding voltage of other blocks within five volts with low quiescent current; synchronism (8) for electrical conditioning if an eventual reference signal for foreign synchronism occurs; blinking sequence generator (9) with means to define the period of time during which the set of lights (6) is on and off. Additionally, this block has means to receive information from the synchronism block to define the moment when a new blinking sequence starts; said set of lights (6) is constituted by LEDs (light emitting diodes) controlled by the blinking sequence generator (9) and its consumption is controlled by means of the current source block (7); and current control (10) to keep the current from the LEDs as constant, no matter which variations of powering voltage of the circuit may occur.

8 Claims, 2 Drawing Sheets

LIGHT MODULE FOR SIGNALING

FIELD OF THE INVENTION

The present invention relates to technical and functional enhancements for visual signaling devices.

BACKGROUND OF THE INVENTION

As known by experts in the art, there are currently numerous electronic devices using light dots or light emitting diodes (LEDs) as lamps for various types of signaling. Signaling devices which produce a high intensity stroboscopic effect are known, however these devices typically require large auxiliary devices, large cooling units, a high voltage power source and employ fragile components, all of which can increase the cost of the device and limit its working life and versatility.

SUMMARY OF THE INVENTION

The present invention seeks to provide a signaling device with the following advantageous features: a) it has a power source defined by a set of light emitting diodes (LEDs); b) electronic means of LED control are provided to reproduce a stroboscopic effect with high light intensity, utilizing low voltage which results in a low dissipated temperature, long working life, high mechanical strength and small physical size; and c) it does not need auxiliary devices to work.

In the present invention, a signaling device comprises an assembly module, the assembly module further comprising a rear portion and a front lens which enclose an electronic circuit, the electronic circuit further comprising a power source circuit for supplying power to the electronic circuit at 5 V and a current with low quiescence; at least one light emitting diode (LED); a current control circuit for controlling the current supplied to the at least one LED regardless of fluctuations in the voltage an electrical synchronization circuit for creating a signal, the signal initiating a blinking sequence, and a blinking sequence generator, the blinking sequence generator configured to define the blinking sequence, the blinking sequence defining the period of time during which the at least one LED is on and off, the blinking sequence generator initiating the blinking sequence upon receiving the signal from the electrical synchronization circuit.

DETAILED DESCRIPTION OF THE INVENTION

Figure 1:
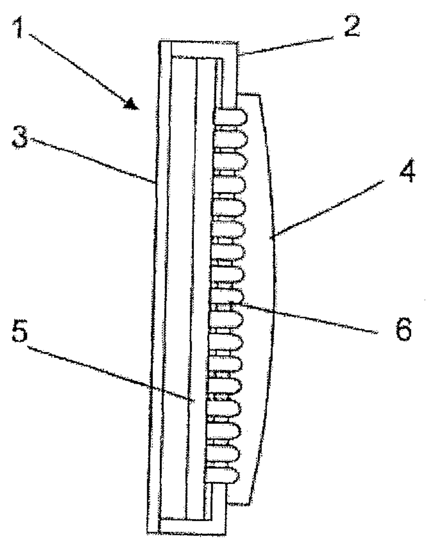
FIG. 1 shows a schematic view of an assembly body.

As can be seen in FIG. 1, the present invention, the light module for signaling of the present invention, is characterized by at least one embodiment initially comprising an assembly module (1) defined by a body, which can take any shape however most preferably will take the shape of a box (2), including a rear portion (3) and a front lens (4), which encloses an electronic circuit (5) and a corresponding set of light emitting diodes (6).

Figure 2:
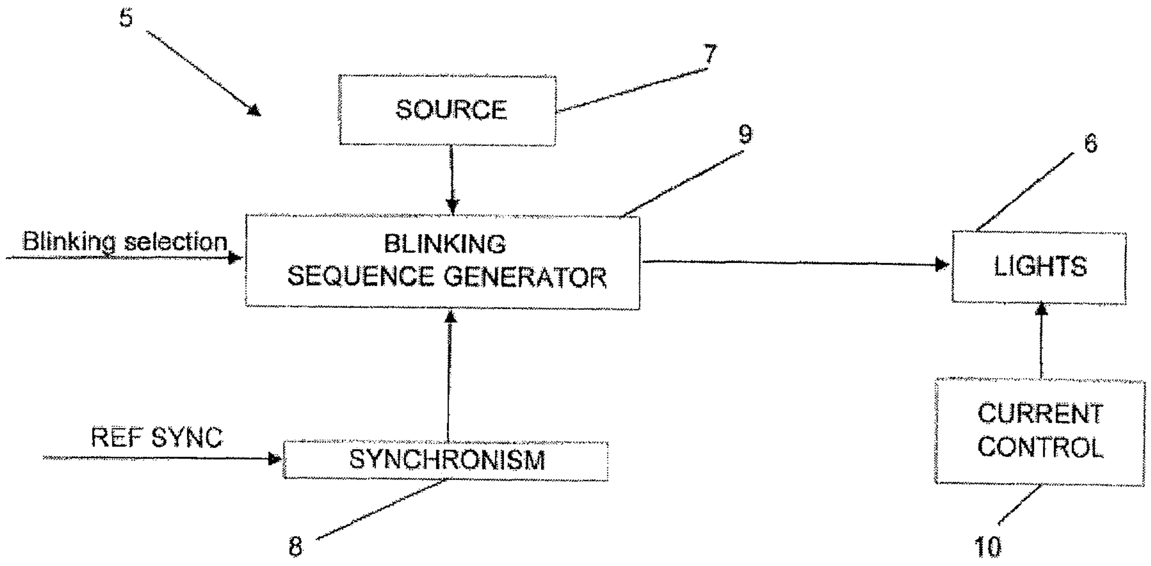
FIG. 2 shows a block diagram of the electronic circuit.

As shown by FIG. 2, electronic circuit (5) is constituted by the following circuits:

- power supply circuit (7) responsible for regulating the supply voltage of the controller within five volts under low quiescent current;
- electrical synchronism circuit (8) responsible for electrically conditioning a reference signal from an external synchronism;
- blinking sequence generator (9) responsible for generating a blinking sequence, defining the period during which light set (6) will be on and off, and this circuit also receives information from the electrical synchronism circuit, defining the moment to start a new blinking sequence;
- light set (6) constituted by LEDs (light emitting diodes) activated by blinking sequence generator (9) having its consumption controlled by power supply circuit (7); and
- current control circuit (10) responsible for providing constant current to the LEDs, regardless of the variations in supply voltage which may take place in the circuit.

Figure 3:
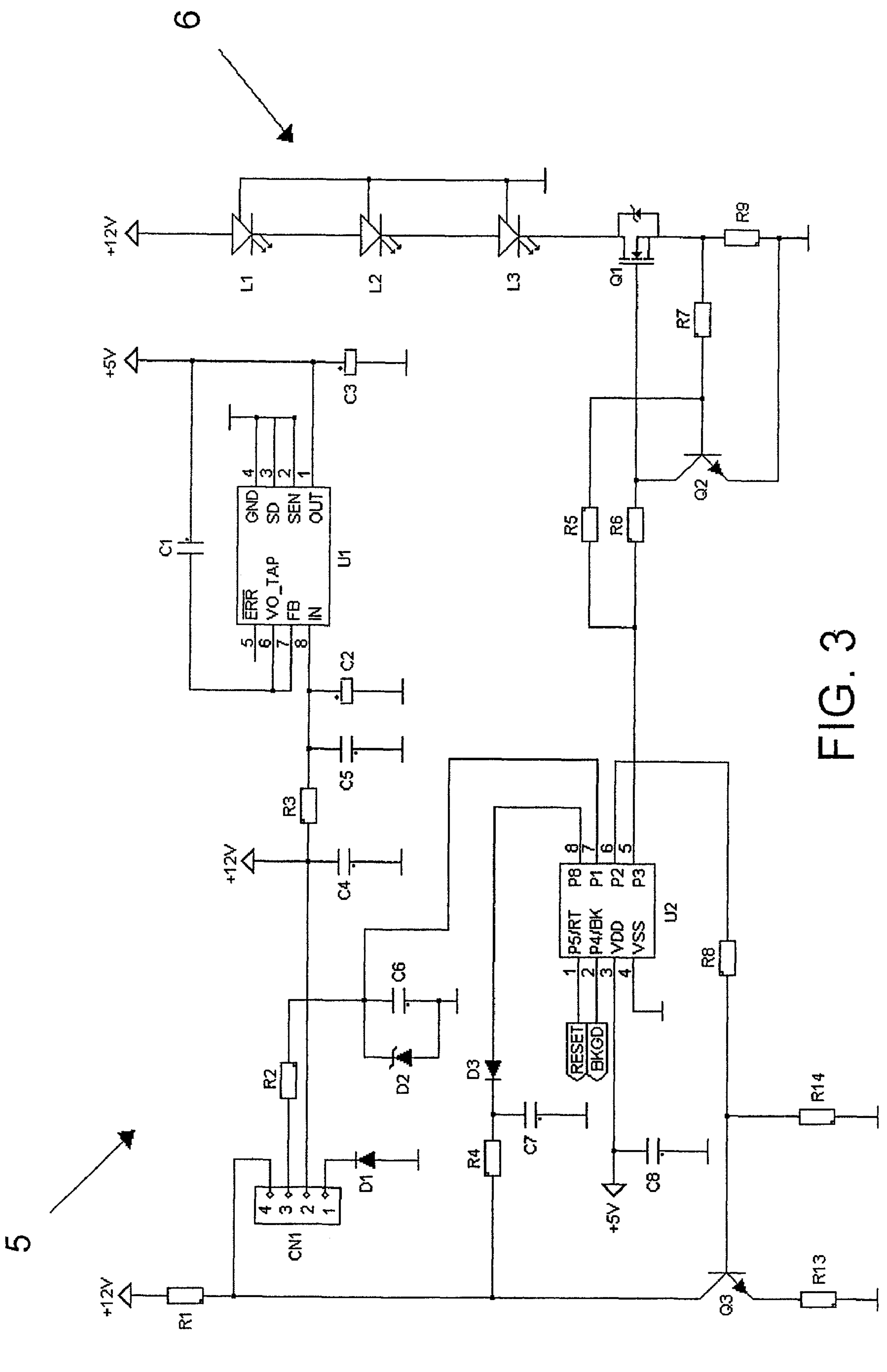
FIG. 3 shows a view of the full electrical scheme of the electronic circuit.

As shown by FIG. 3, in a preferred embodiment, source circuit (7) is composed of diode (D1), capacitors (C1-C2-C3-C4-C5-C8), resistor (R3) and controller (U1) so that capacitors (C4-C5-C2) and resistor (R3) form a filter (RC) at the inlet (in pin 8) of controller (U1) eliminating spurious signals coming from the battery. Controller (U1) supplies the 5 V outlet voltage (out pin 1) under low quiescent current to be filtered by capacitors (C3-C8) and will subsequently supply controller (U2). Capacitor (C1) helps controller (U1) for regulation and diode (D1) is located in such a way to avoid burning the circuit in case the battery poles are inverted, (i.e.: 12 V connected to pin 1 of connector (CN1) and 0 V connected to pin (2) of connector (CN1)).

Synchronism circuit (8) is composed of resistors (R1-R4-R8-R13-R14), diode (D3), capacitor (C7) and transistor (Q3), joined in such a way that resistors (R1-R8-R13 and R14) are the polarizing resistors of transistor (Q3) activated by controller (U2) by means of gate (6) whenever a blinking cycle ends. This informs other external equipment of its synchronism state. Diode (D3), resistor (R4) and capacitor (C7) form an electrical signal conditioning circuit, so that, if there are twelve volts supplied at pin four of connector (CN1), pin eight of controller (U2) has a five-volt voltage and, when pin four of connector (CN1) has zero volts, pin eight of connector (CN1) also has zero volts. This arrangement allows controller (U2) to receive external synchronism signals.

The circuit of blinking sequence generator (9) is defined by controller (U2), resistor (R2), diode (D2) and capacitor (C6), joined in such a way that resistor (R2), diode (D2) and capacitor (C6) form a signal conditioning circuit, so that, when there are twelve volts at pin three of connector (CN1), pin seven of controller (U2) has five volts and, when pin three of connector (CN1) has zero volts, pin seven of connector (CN1) also has zero volts, thus allowing controller (U2) to identify a foreign request to change the blinking sequence. Controller (U2) generates the blinking sequence through pin five by commuting transistor (Q1).

Light set (6) is formed by the LEDs (light emitting diodes) (L1-L2-L3) joined in series to be submitted to the same power of operation. LEDs as used may combine one, two or more colors, depending on the desired lighting effect, not however requiring a change in the basic working concept of the set.

The current control set (10) is responsible for controlling the flow of current through the LEDs, varying it linearly and inversely to the room temperature, being therefore composed by transistors (Q1-Q2), resistors (R5-R6-R7 and R9) joined in such a way that the resistors (R5-R6-R7 and R9) are for polarization of transistor (Q2 and Q1), which control the flow of current through the LEDs. The circuit works in such a way that, when the current on the LEDs increase, the voltage at resistor (R9) also increases, causing transistor (Q2) to conduct, with a consequent reduction in VCE voltage (collector emitter voltage) of transistor (Q2) and consequent reduction of the voltage at control gate (GATE) of transistor (Q1), which will reduce the current of the LEDs. Since VBE voltage (base emitter voltage) of (Q2) is inversely proportional to temperature, current changes according to room temperature, considerably increasing under cold conditions and linearly decreasing under hot conditions. The same process occurs inversely. When the current on the LEDs decreases, the voltage in resistor (R9) also decreases, causing transistor (Q2) to be cut with a consequent increase in VCE voltage (collector emitter voltage) of transistor (Q2) and consequent increase of the voltage at control gate (GATE) of transistor (Q1), which will cause the increase in the current of the LEDs.

In this embodiment, the present signaling device produces a stroboscopic effect with high light intensity, including other technical and practical advantages as follows: it allows the assembly in a compact body; it is easily installed; it allows flexibility of use; high angle coverage; high lighting efficiency; selectable flash patterns; easy synchronism by using one single wire; it may be combined in different ways such as other modules to compose any signaling system; and the body may receive any external treatment and unique details, especially sealing or compatible sealing for the use of the set, including a rubber base and fixing means for assembly to any surface.

It will be understood that given features and combinations of electronic circuit (5) may considerably vary by keeping the same functional concept for the set, and we consequently notice that the embodiment now disclosed in detail as an example is clearly subject to embodiment variations, but always within the scope of the inventive concept of a stroboscopic effect simulating circuit with a set of LEDs as disclosed herewithin.

It should be understood that the preferred embodiments mentioned here are merely illustrative of the present invention. Numerous variations in design and use of the present invention may be contemplated in view of the following claims without straying from the intended scope and field of the invention herein disclosed.

The invention claimed is:

1. A signaling device, comprising:

(1) an assembly module further comprising a rear portion and a front lens which enclose an electronic circuit, the electronic circuit further comprising:

(1a) a powersource circuit for supplying power to the electronic circuit at 5 V and a current with low quiescence;

(1b) at least one light emitting diode (LED);

(1c) a current control circuit for controlling the current supplied to the at least one LED regardless of fluctuations in the voltage;

(1d) an electrical synchronization circuit for creating a signal, the signal initiating a blinking sequence, and (1e) a blinking sequence enerator the blinking sequence generator confingured to define the blinkin sequence, the blinking sequence defining the period of time during which the at least one LED is on and off, the blinking sequence generator initiating the blinking sequence upon receiving the signal from the electrical synchronization circuit, wherein the power source circuit further comprises:

(2) a battery, the battery providing power to the power source circuit;

(3) a filter, the filter constructed of at least one resistor and at least one capacitor;

(4) a diode, the diode adapted to protect the power source circuit in case polarity of the battery is inverted, and (5) a controller; the controller having an input and an output;

wherein the filter regulates the power at the input of the controller such that the voltage is 5 V and the current has low quiescence.

2. A signaling device, comprising:

(1) an assembly module, the assembly module further comprising a rear portion and a front lens which enclose an electronic circuit, the electronic circuit further comprising:

(1a) a power source circuit for supplying power to the electronic circuit at 5 V and a current with low quiescence;

(1b) at least one light emitting diode (LED);

(1c) a current control circuit for controlling the current supplied to the at least one LED regardless of fluctuations in the voltage;

(1d) an electrical synchronization circuit for creating a signal, the signal initiating a blinking sequence, and (1e) a blinking sequence generator, the blinking sequence generator configured to define the blinking sequence, the blinking sequence defining the period of time during which the at least one LED is on and off, the blinking sequence generator initiating the blinking sequence upon receiving the signal from the electrical synchronization circuit, wherein the electronic synchronization circuit is configured to provide synchronization status to externally connected devices, the electronic synchronization circuit further comprising:

(6) a controller, the controller having eight pins;

(7) a connector, the connector having eight pins;

(8) a plurality of resistors;

(9) at least one diode;

(10) at least one capacitor, and

(11) at least one transistor;

wherein one of the plurality of resistors is configured as a polarizing resistor of the at least one transistor, the at least one transistor being activated by the controller whenever the blinking sequence ends, and wherein the at least one diode, the at least one of the plurality of resistors and the at least one capacitor form an electrical signal conditioning circuit such that the controller is configured to receive an external synchronization signal when 12 V is supplied to pin four of the connector and 5 V is supplied to pin eight of the controller.

3. A signaling device, comprising:

(1) an assembly module, the assembly module further comprising a rear portion and a front lens which enclose an electronic circuit, the electronic circuit further comprising:

(1a) a power source circuit for supplying power to the electronic circuit at 5 V and a current with low quiescence;

(1b) at least one light emitting diode (LED);

(1c) a current control circuit for controlling the current supplied to the at least one LED regardless of fluctuations in the voltage;

(1d) an electrical synchronization circuit for creating a signal, the signal initiating a blinking sequence, and (1e) a blinking sequence generator, the blinking sequence generator configured to define the blinking sequence, the blinking sequence defining the period of time during which the at least one LED is on and off, the blinking sequence generator initiating the blinking sequence upon receiving the signal from the electrical synchronization circuit, wherein the electronic synchronization circuit is configured to provide synchronization status to externally connected devices, the electronic synchronization circuit further comprising:

(6a) a controller, the controller having eight pins;

(7a) a connector, the connector having eight pins;

(8a) a plurality of resistors;

(9a) at least one diode;

(10a) at least one capacitor, and (11a) at least one transistor;

wherein at least one of the plurality of resistors is configured as a polarizing resistor of the at least one transistor, the at least one transistor being activated by the controller whenever a blinking sequence ends, and wherein the at least one diode, one of the plurality of resistors and the at least one capacitor form an electrical signal conditioning circuit such that the controller is configured to receive external synchronization signals when 0 V is supplied to pin four of the connector and 0 V is supplied to pin eight of the controller.

4. A signaling device, comprising:

(1) an assembl module the assembl module further comprising a rear portion and a front lens which enclose an electronic circuit, the electronic circuit further comprising:

(1a) a power source circuit for supplying power to the electronic circuit at 5 V and a current with low quiescence;

(1b) at least one light emitting diode (LED);

(1c) a current control circuit for controlling the current supplied to the at least one LED regardless of fluctuations in the voltage;

(1d) an electrical synchronization circuit for creating a signal, the signal initiating a blinking sequence, and (1e) a blinking sequence generator, the blinking sequence generator configured to define the blinking sequence, the blinking sequence defining the period of time during which the at least one. LED is on and off, the blinking sequence generator initiating the blinking sequence upon receiving the signal from the electrical synchronization circuit, wherein the blinking sequence generator circuit further comprises:

(12) a controller, the controller having eight pins;

(13) a connector, the connector having eight pins;

(14) at least one resistor;

(15) at least one diode;

(16) at least one capacitor, and

(17) a transistor;

wherein the at least one resistor, the at least one diode and the at least one capacitor are configured to form a signal conditioning circuit such that when 12 V is supplied to pin three of the connector, 5 V is supplied to pin seven of the controller, 0 V is supplied to pin three of the connector and 0 V are supplied to pin seven of the connector, the controller can identify an external request to change the blinking sequence, the controller generating the blinking sequence through pin five of the controller by commuting the at least one transistor.

5. The signaling device of claim 1, wherein the at least one LED further comprises three LEDs joined in series such that each of the three LEDs receives the same current flow.

6. The signaling device of claim 5, wherein each of the three LEDs are a different colour.

7. The signaling device of claim 5, wherein the three LEDs are the same colour.

8. A signaling device, comprising:

(1) an assembly module, the assembly module further comprising a rear portion and a front lens which enclose an electronic circuit, the electronic circuit further comprising:

(1a) a power source circuit for supplying power to the electronic circuit at 5 V and a current with low quiescence;

(1b) at least one light emitting diode (LED);

(1c) a current control circuit for controlling the current supplied to the at least one LED regardless of fluctuations in the voltage;

(1d) an electrical synchronization circuit for creating a signal, the signal initiating a blinking sequence, and (1e) a blinking sequence generator, the blinking sequence generator configured to define the blinking sequence, the blinking sequence defining the period of time during which the at least one LED is on and off, the blinking sequence generator initiating the blinking sequence upon receiving the signal from the electrical synchronization circuit wherein the current control circuit further comprises:

(18) a transistor, the transistor configured to control current flow to the at least one LED;

wherein a network of resistors is configured to polarize the transistor and the current control circuit is configured to vary the current to the at least one LED linearly and inversely with room temperature.

* * * * *